(12) United States Patent
Manzaki (10) Patent No.: US 9,757,910 B2
(45) Date of Patent: Sep. 12, 2017

(54) INJECTION MOLDED PRODUCT AND METHOD FOR MANUFACTURING SAME

(71) Applicant: TOKAI KOGYO CO., LTD., Obu-shi, Aichi (JP)

(72) Inventor: Fumie Manzaki, Obu (JP)

(73) Assignee: TOKAI KOGYO CO., LTD., Obu-shi (JP)

(*) Notice: Subject to any disclaimer, the term of this patent is extended or adjusted under 35 U.S.C. 154(b) by 317 days.

(21) Appl. No.: 14/387,370

(22) PCT Filed: Mar. 26, 2013

(86) PCT No.: PCT/JP2013/058728
§ 371 (c)(1),
(2) Date: Sep. 23, 2014

(87) PCT Pub. No.: WO2013/150916
PCT Pub. Date: Oct. 10, 2013

(65) Prior Publication Data
US 2015/0064404 A1   Mar. 5, 2015

(30) Foreign Application Priority Data

Apr. 2, 2012  (JP) ................. 2012-084327

(51) Int. Cl.
*B29C 71/02*   (2006.01)
*C08J 9/32*    (2006.01)
(Continued)

(52) U.S. Cl.
CPC .......... *B29C 71/02* (2013.01); *B29C 35/0266* (2013.01); *B29C 44/352* (2013.01);
(Continued)

(58) Field of Classification Search
CPC .......... C08J 9/32; C08J 9/36; C08J 9/38; C08J 2203/22; B29C 71/02; B29C 2071/022;
(Continued)

(56) References Cited

U.S. PATENT DOCUMENTS 4,108,806 A * 8/1978 Cohrs ................. C08J 9/32
                                                     521/56
5,350,211 A * 9/1994 Yada ................. B60J 10/70
                                                     296/93

(Continued)

FOREIGN PATENT DOCUMENTS

CN    1487875 A    4/2004
CN    1717345 A    1/2006
(Continued)

OTHER PUBLICATIONS

Human translation of JP 2002-146087 A. Translated Nov. 2009.*
(Continued)

*Primary Examiner* — Nathan Van Sell
*Assistant Examiner* — Ethan A Utt
(74) *Attorney, Agent, or Firm* — Oliff PLC (57) ABSTRACT

In an injection molded product of the invention, an unevenness forming portion having unevenness formed by thermal expansion of thermally expandable capsules is formed. The injection molded product includes a highly expanded portion that is formed at a surface side of the unevenness forming portion in a thickness direction of the injection molded product and in which the thermally expandable capsules are thermally expanded, and a main body portion that is a portion adjacent to the highly expanded portion in the thickness direction and in which the thermally expandable capsules are substantially not thermally expanded. The thickness of the highly expanded portion is a half or smaller than the thickness of the injection molded product in the (Continued)

unevenness forming portion, and a polymer material of the highly expanded portion and a polymer material of the main body portion are the same polymer material.

11 Claims, 8 Drawing Sheets (51) Int. Cl.
| | |
|---|---|
| B29C 45/00 | (2006.01) |
| B32B 3/30 | (2006.01) |
| B29C 35/02 | (2006.01) |
| B29C 59/16 | (2006.01) |
| B29C 44/34 | (2006.01) |
| B29K 105/16 | (2006.01) |
| B29K 101/12 | (2006.01) |
| B29K 105/00 | (2006.01) |
| B29C 35/08 | (2006.01) |
| B29K 105/04 | (2006.01) |
| B29C 70/66 | (2006.01) |

(52) U.S. Cl.
CPC .......... *B29C 45/0013* (2013.01); *B29C 59/16* (2013.01); *B32B 3/30* (2013.01); *C08J 9/32* (2013.01); *B29C 45/0001* (2013.01); *B29C 45/0053* (2013.01); *B29C 70/66* (2013.01); *B29C 2035/0822* (2013.01); *B29C 2035/0838* (2013.01); *B29K 2101/12* (2013.01); *B29K 2105/0005* (2013.01); *B29K 2105/046* (2013.01); *B29K 2105/048* (2013.01); *B29K 2105/165* (2013.01); *B29K 2995/0012* (2013.01); *B29K 2995/0044* (2013.01); *B29K 2995/0072* (2013.01); *B32B 2305/028* (2013.01); *C08J 2203/22* (2013.01); *C08J 2300/22* (2013.01); *C08J 2300/26* (2013.01); *C08J 2323/06* (2013.01); *C08J 2323/12* (2013.01); *C08J 2325/06* (2013.01); *C08J 2353/02* (2013.01); *Y10T 428/2438* (2015.01)

(58) Field of Classification Search
CPC ........ B29C 2071/025; B29C 2017/027; B29C 71/04; B29C 2071/02; Y10T 428/24355–428/24471; Y10T 428/24479–428/2462; B32B 3/26; B32B 3/30; B32B 5/14; B32B 5/142; B32B 5/145; B32B 5/147; B60R 13/06; B60J 10/00; B60J 10/02; B60J 10/08; B60J 10/15; B60J 10/18; B60J 10/26; B60J 10/265; B60J 10/80; B60J 10/86

USPC .......... 428/141–155, 156–173; 264/232–237
See application file for complete search history.

(56) References Cited

U.S. PATENT DOCUMENTS

| | | | | |
|---|---|---|---|---|
| 5,443,299 | A | * | 8/1995 | Yada ................ B60J 10/70 296/93 |
| 5,833,297 | A | * | 11/1998 | Yada ................ B60J 10/70 296/93 |
| 6,004,641 | A | * | 12/1999 | Tettamble ............ C08J 9/32 428/315.5 |
| 2002/0178656 | A1 | * | 12/2002 | Nozaki ............ B29C 45/14409 264/259 |
| 2004/0005442 | A1 | | 1/2004 | Sekine |
| 2004/0197545 | A1 | * | 10/2004 | Gehlsen ................ C08J 9/32 428/315.5 |
| 2005/0186396 | A1 | * | 8/2005 | Okajima ............ B60J 10/80 428/167 |
| 2006/0186695 | A1 | | 8/2006 | Hiroe et al. |
| 2009/0169821 | A1 | | 7/2009 | Takeuchi et al. |
| 2011/0239410 | A1 | * | 10/2011 | Goto ................ B60J 10/76 264/51 |
| 2011/0308170 | A1 | * | 12/2011 | Goto ................ B60J 10/76 49/489.1 |
| 2012/0015162 | A1 | * | 1/2012 | Lion ................ B32B 5/18 428/206 |

FOREIGN PATENT DOCUMENTS

| | | | | |
|---|---|---|---|---|
| CN | 101469079 A | | 7/2009 | |
| DE | 19834688 A1 | * | 2/2000 | ............ B60J 10/20 |
| JP | 60027527 A | * | 2/1985 | ............ B29C 59/16 |
| JP | A-7-314466 | | 12/1995 | |
| JP | H08-57888 A | | 3/1996 | |
| JP | A-2002-146087 | | 5/2002 | |
| JP | A-2003-260727 | | 9/2003 | |
| JP | A-2008-105353 | | 5/2008 | |
| JP | A-2009-161587 | | 7/2009 | |

OTHER PUBLICATIONS

Machine translation (Espacenet) of DE 19834688 A1. Translated Feb. 6, 2017.*
Machine translation (Espacenet) of JP S60027527 A. Translated Feb. 6, 2017.*
International Search Report issued in International Application No. PCT/JP2013/058728 mailed Jul. 16, 2013.
Oct. 7, 2014 International Preliminary Report on Patentability issued in International Application No. PCT/JP2013/058728.
Sep. 28, 2015 Office Action issued in Chinese Patent Application No. 201380016128.0.

* cited by examiner

FIG.11

INJECTION MOLDED PRODUCT AND METHOD FOR MANUFACTURING SAME

TECHNICAL FIELD

The present invention relates to an injection molded product that is formed by using a polymer material, and a method for manufacturing the same. Particularly, the invention relates to an injection molded product formed by using a polymer material having thermally expandable capsules mixed therein and exhibiting a fabric-like appearance by fine unevenness being formed on a surface of the article, and a method for manufacturing the injection molded product.

The present application claims priority based on Japanese Patent Application No. 2012-084327, filed Apr. 2, 2012, the entire content of which is incorporated in the present description by reference.

BACKGROUND ART

There is known a molded product that is formed by injection molding a molding material having a polymer material and a plurality of thermally expandable capsules mixed therein. There is known a molded product in which excellent improvement in appearance quality is realized by forming unevenness based on the thermal expansion of the thermally expandable capsules or burst of the thermally expandable capsules after the thermal expansion on the surface of the molded product, thereby giving a fabric-like appearance to the surface of the molded product.

For example, a molded product in which unevenness is generated on the surface of a composition having a thermoplastic resin and a micro-balloon expansion agent mixed therein is described in Patent Document 1. An interior part having a hard layer made of polyurethane resin or the like, and a surface layer that is integrated onto this hard layer and has bubbles mixed therein by foaming non-foamed beads is described in Patent Document 2. A decorative body having unevenness based on destruction of capsules on a surface thereof is described in Patent Document 3.

CITATION LIST

Patent Literature

Patent Document 1: JP-A-2003-260727
Patent Document 2: JP-A-H07-314466
Patent Document 3: JP-A-2002-146087

SUMMARY OF INVENTION

Technical Problem

However, in the technique described in the aforementioned Patent Document 1, all of the micro-balloon expansion agent mixed in the composition is thermally expanded in a mold-retracting step. For this reason, the density of the entire molded product will decrease and the rigidity thereof will decrease. Additionally, the mold is opened before the surface of the composition filling the mold solidifies, or the mold is closed after the unevenness is generated on the surface of the composition. For this reason, it is necessary to make the shape of the molded product into a shape for which it is easy to open and close the mold. This limits the shape of the molded product.

Additionally, in the technique described in Patent Document 2, the surface layer is integrated onto the hard layer. For this reason, there is a concern that the surface layer may be deformed due to the heat or pressure generated during the molding of the hard layer, or the surface layer may be peeled off from the hard layer and the appearance of the molded product may become poor. Additionally, it is necessary to prepare a coating having non-foamed beads dispersed in advance in order to form the surface layer, and the manufacturing process of the molded product is complicated.

The invention has been made in order to solve the aforementioned problems, and an object thereof is to provide an injection molded product that suppresses a decrease in the rigidity of a molded product and is excellent in appearance quality due to unevenness formed on the surface of the molded product, and a method for manufacturing the same.

Solution to Problem

An injection molded product of the invention, which is constructed so as to realize the above-described object, is the injection molded product that is injection molded from a molding material including a polymer material and a plurality of thermally expandable capsules mixed therein.

Specifically, an unevenness forming portion, which has unevenness formed by thermal expansion of the thermally expandable capsules, is formed to at least a portion of a surface of the injection molded product. The injection molded product includes: a highly expanded portion that is formed at a surface side of the unevenness forming portion in a thickness direction of the injection molded product and in which the thermally expandable capsules are thermally expanded; and a main body portion that is a portion adjacent to the highly expanded portion in the thickness direction and in which the thermally expandable capsules are substantially not thermally expanded. A thickness of the highly expanded portion is a half or smaller than a thickness of the injection molded product in the unevenness forming portion, and a polymer material of the highly expanded portion and a polymer material of the main body portion are the same polymer material.

Incidentally, "the thermally expandable capsules are substantially not thermally expanded" in the present description is a term including a case where the thermally expandable capsules are not thermally expanded, and a case where the thermally expandable capsules are slightly thermally expanded (namely, a case where particle diameter increase of a majority of the thermally expandable capsules included in the main body portion before and after the thermal expansion is 20% or less).

Since the injection molded product of the invention having this configuration includes the highly expanded portion in which the thermally expandable capsules are thermally expanded and the main body portion in which the thermally expandable capsules are substantially not thermally expanded, and the unevenness forming portion is formed to the surface of the injection molded product (the surface of the highly expanded portion), excellent appearance quality can be obtained.

Moreover, the highly expanded portion and the main body portion are molded from the same polymer material (typically, thermoplastic resin), and the unevenness is formed on the surface of the highly expanded portion that is integrally molded with the main body portion, without forming a surface layer separately from the main body portion. For this reason, the main body portion and the highly expanded portion are not peeled off, and the appearance of the injection molded product can be prevented from being poor.

Furthermore, the thickness of the highly expanded portion in which the thermally expandable capsules are thermally expanded is a half or smaller than the thickness of the injection molded product in the unevenness forming portion, and the thermally expandable capsules are substantially not thermally expanded in the main body portion as the other portion. For this reason, compared to when the thermally expandable capsules of the main body portion are thermally expanded, a decrease in the density of the injection molded product can be made small, and the rigidity of the injection molded product can be suppressed from decreasing.

According to a preferable aspect of the injection molded product disclosed herein, the unevenness forming portion is partially formed to the surface of the injection molded product.

According to this configuration, since desired characters, desired figures, or the like can be formed on the surface of the injection molded product by using the unevenness forming portions, the injection molded product that is excellent in design properties can be provided.

According to a preferable aspect of the injection molded product disclosed herein, the unevenness forming portion is visually recognizable when the injection molded product is mounted on a predetermined portion, and is formed to at least a portion of a design surface formed to the surface of the injection molded product.

According to this configuration, since desired characters, desired figures, or the like can be formed on the design surface of the injection molded product that is visually recognizable by using the unevenness forming portions, the injection molded product that is excellent in design properties can be provided.

According to a preferable aspect of the injection molded product disclosed herein, the unevenness forming portion includes: a first unevenness portion; and a second unevenness portion having a lower degree of unevenness as compared to the first unevenness portion.

According to this configuration, since desired characters, desired figures, or the like can be formed on the surface of the injection molded product by using the shade (or the degree of brightness) of a color resulting from a difference between the degrees of unevenness, the injection molded product that is excellent in design properties can be provided.

According to a preferable aspect of the injection molded product disclosed herein, an average particle diameter of the thermally expandable capsules included in the main body portion is smaller than 50 µm, and an average particle diameter of the thermally expandable capsules included in the highly expanded portion is 50 µm or larger.

According to this configuration, since the thermally expandable capsules are substantially not thermally expanded in the main body portion, a decrease in density is small. In contrast, since the thermally expandable capsules are thermally expanded in the highly expanded portion, the unevenness is formed on the surface of the highly expanded portion, and the appearance quality is excellent.

According to a preferable aspect of the injection molded product disclosed herein, in the surface of the highly expanded portion, a maximum cross-section height Rt of a roughness curve (contour curve) specified in JIS B0601: 2001 is 30 µm or larger and smaller than 200 µm.

According to this configuration, since the unevenness of a preferable aspect is formed on the surface of the injection molded product, the appearance quality is excellent.

According to a preferable aspect of the injection molded product disclosed herein, the injection molded product is a vehicle interior equipment that is attachable to a predetermined portion inside a vehicle, includes at least one design surface exposed to an interior of the vehicle when being mounted on the predetermined portion, and has the unevenness forming portion formed to at least a portion of the design surface.

According to this configuration, the fabric-like appearance is given to the design surface, and the injection molded product that is excellent in appearance quality can be used as the vehicle interior equipment.

Further, in order to realize the above-described object, in the invention, there is provided a method of manufacturing an injection molded product including a polymer material and a plurality of thermally expandable capsules and having unevenness formed by thermal expansion of the thermally expandable capsules at a surface thereof. Specifically, the method includes: a filling step of injecting and filling a molding material having the polymer material and the thermally expandable capsules mixed therein into an injection mold formed with a molding cavity having a predetermined shape; a molding step of cooling and solidifying the filled molding material to mold an injection molded body; a taking-out step of taking out the cooled and solidified injection molded body from the injection mold; and a heating step of heating at least a portion of the surface of the taken-out injection molded body and thermally expanding the thermally expandable capsules included in a predetermined portion from the surface of the injection molded body to a thickness of a half or smaller of the thickness of the injection molded body, wherein an unevenness forming portion, which has the unevenness formed by the thermal expansion of the thermally expandable capsules, is formed to at least a portion of the surface of the injection molded product.

In the method for manufacturing the injection molded product of the invention having this configuration, in the heating step, the unevenness forming portion is formed to at least a portion of the surface of the injection molded body by heating at least a portion of the surface of the injection molded body and thermally expanding the thermally expandable capsules that are present at the surface side of the injection molded body. For this reason, it is not necessary to prepare a coating, a material, or the like for separately forming a surface layer, and the injection molded product having the unevenness on the surface thereof can be manufactured. Also, since a decrease in density is small in the portion (main body portion) in which the thermally expandable capsules do not thermally expand, a decrease in the rigidity of the injection molded product can be suppressed.

Additionally, since the unevenness forming portion is directly formed on the surface of the injection molded body after the injection molded body is cooled and solidified, and is taken out from the injection mold, defects that may occur when a surface layer is separately formed, for example, deformation of the surface layer and peeling-off the surface layer from the main body portion, which are caused by the heat or pressure during injection molding, do not occur.

Moreover, since the thermally expandable capsules are not thermally expanded within the injection mold, a general-purpose injection mold can be used without necessitating use of a special injection mold for thermally expanding the thermally expandable capsules when the injection molded body is molded.

According to a preferable aspect of the method disclosed herein, the surface of the injection molded body is partially covered with a heat shield before the heating step, and the unevenness forming portion is partially formed to the surface of the injection molded body by heating a portion exposed without being covered with the heat shield in the heating step.

According to this configuration, since desired characters, desired figures, or the like can be formed on the surface of the injection molded body, the injection molded product that is excellent in design properties can be manufactured.

According to a preferable aspect of the method disclosed herein, in the heating step, after removing the heat shield, by further heating the surface of the injection molded body, degrees of the unevenness of the unevenness forming portion formed to a portion covered in advance with the heat shield and the unevenness forming portion formed to a portion that is not covered with the heat shield are made different from each other.

According to this configuration, desired characters, or the like can be formed on the surface of the injection molded body, using the shade of a color resulting from a difference between the degrees of unevenness. For this reason, the injection molded product that is excellent in design properties can be manufactured.

According to a preferable aspect of the method disclosed herein, in the heating step, after the surface of the injection molded body is heated, by partially covering the surface of the injection molded body with a heat shield and further heating the portion that is exposed without being covered with the heat shield, degrees of the unevenness of the unevenness forming portion formed to a portion covered with a heat shield and the unevenness forming portion formed to a portion that is not covered with the heat shield are made different from each other.

According to this configuration, desired characters, or the like can be formed on the surface of the injection molded body, using the shade of a color resulting from a difference between the degrees of unevenness. For this reason, the injection molded product that is excellent in design properties can be manufactured.

According to a preferable aspect of the method disclosed herein, in the heating step, the heating of the injection molded body is performed by using radiant heat.

According to this configuration, the thermally expandable capsules can be thermally expanded by partially heating the surface of the injection molded body. For this reason, deformation of the injection molded body can be made small compared to a case where the entire injection molded body is heated. Additionally, since a region to be heated can be arbitrarily selected, the unevenness can be partially formed.

According to a preferable aspect of the method disclosed herein, the radiant heat is generated by using a near-infrared ray irradiation apparatus.

According to this configuration, by using a simple equipment, at least one region of the surface of the injection molded body can be heated and the thermally expandable capsules can be thermally expanded.

DESCRIPTION OF EMBODIMENTS

Preferred embodiments of the invention will be described hereinafter. In addition, matters that are other than matters particularly mentioned in the present specification and are required for carrying out the invention can be understood as design matters of those skilled in the art based on the conventional art. The invention can be carried out on the basis of matters disclosed in the present description and drawings and the technical common sense in this field.

An injection molded product disclosed herein is typically one injection molded from a molding material in which a polymer material and thermally expandable capsules (namely, capsules having the property to expand by heating) are mixed. In the injection molded product, an unevenness forming portion having unevenness formed by the thermal expansion of the thermally expandable capsules is formed to at least a portion of the surface of the injection molded product.

First, the materials used for the injection molded product according to an embodiment of the invention will be described.

<1. Polymer Material>

The polymer material used for the injection molded product disclosed herein serves as a matrix (a main material serving as a base material) that disperses the aforementioned thermally expandable capsules. As the polymer material, materials that have been used for the injection molded product in the past can be used without being particularly limited. For example, various thermoplastic resins and rubber can be used. The thermoplastic resins include, for example, polyolefin-based resins, such as polyethylene and polypropylene; styrene-based resins, such as polystyrene and acrylonitrile styrene butadiene resin (ABS); vinyl chloride resin; and the like. Additionally, thermoplastic elastomers can also be used. The thermoplastic elastomers include, for example, various thermoplastic elastomers, such as a styrene-based elastomer, an olefin-based elastomer, an ester-based elastomer, a polyamide-based elastomer, a vinyl-chloride-based elastomer, and an urethane-based elastomer. In the injection molded product disclosed herein, for example, the thermoplastic elastomers are preferably used as the polymer material.

<2. Thermally Expandable Capsules>

The thermally expandable capsules used for the injection molded product disclosed herein are typically constituted as particles in which encapsulated substance (usually, a gas, a solid, or a liquid that is evaporated (gasified) by heating) that increases occupied volumes by heating are contained within outer shells made of a thermoplastic resin. Materials constituting the outer shells of the thermally expandable capsules include, for example, thermoplastic resins, such as polyvinylidene chloride, a vinylidene chloride acrylonitrile copolymer, polyacrylonitrile, an acrylonitrile-based copolymer, acrylic (co)polymers such as polymethylmethacrylate, and polyvinyl chloride. Additionally, substances (expanding agents) that are encapsulated by the thermally expandable capsules include, for example, low-boiling-point hydrocarbons, such as n-pentane, n-hexane, n-butane, isobutane, and isopentane. The encapsulated substances are not limited to the low-boiling-point hydrocarbons, and for example, inert gases (some or all can be obtained in a liquefied state), such as nitrogen and argon, in addition to air and carbon dioxide, can also be the encapsulated substances. If such thermally expandable capsules are heated, a thermoplastic resin that constitutes the outer shells of the thermally expandable capsules softens, and the aforementioned encapsulated substance received inside the outer shells expand in volume (that is, the aforementioned encapsulated substance functions as an expanding agent), whereby the thermally expandable capsules thermally expand. Furthermore, the thermally expandable capsules may explode by portions or the whole of the outer shells being stretched beyond the limit of expansion. Fine unevenness is formed on the surface of a decorative portion by the expansion of such capsules or the explosion of the capsules after the expansion.

The shape before the thermal expansion of the thermally expandable capsules disclosed herein is not limited. For example, various shapes, such as a substantially spherical shape, a spindle shape, an indefinite shape, and a cylindrical shape, can be taken. From the viewpoints of the dispersibility of the thermally expandable capsules and the decorative effect after the thermal expansion, the thermally expandable capsules preferably have a substantially spherical shape. The average particle diameter of the thermally expandable capsules before the thermal expansion is about 15 μm or larger and 40 μm or smaller. Additionally, the average particle diameter of the thermally expandable capsules after the thermal expansion is about 50 μm or larger.

In addition, the aforementioned average particle diameter is the average value of particle diameters of thermally expandable capsules. This average particle diameter can be easily measured by observation using an optical microscope or an electron microscope (for example, a transmission electron microscope or a scanning electron microscope). For example, the average particle diameter is measured by randomly extracting a predetermined number (for example, about 40 pieces) of thermally expandable capsules from the cross-section of a highly expanded portion and the cross-section of a main body portion in the injection molded product to be described below, respectively, and taking the longest diameter of the respective extracted thermally expandable capsules by the aforementioned observation using the optical microscope or the like, as the particle diameters. Then, the average value of the particle diameters of the respective thermally expandable capsules measured from the highly expanded portion is defined as the average particle diameter (the average particle diameter after the thermal expansion) of the thermally expandable capsules included in the highly expanded portion. Additionally, the average value of the particle diameters of the thermally expandable capsules measured from the main body portion is defined as the average particle diameter of the thermally expandable capsules included in the main body portion.

Marketed products (including those marketed in a masterbatched state) of the thermally expandable capsules that are preferably used include a trade name "ADVANCELL (registered trademark)" made by Sekisui Chemical Co., Ltd., a trade name "EXPANCEL MICROSPHERE (trademark)" made by Akzo Nobel N.V., a trade name "MATSUMOTO MICROSPHERE (registered trademark)" made by Matsumoto Yushi-Seiyaku Co. Ltd., a trade name "DIEFORM (registered trademark)" made by Dainichiseika Color & Chemicals Mfg. Co., Ltd., and the like.

The molding material can be made to contain various accessory ingredients other than the aforementioned polymer material and thermally expandable capsules if necessary. An example of such accessory ingredients includes a powdered and/or fibrous solid filling material. Examples of this solid filling material include ceramic powder (including inorganic compound powder, such as talc: the same applies to the following), carbon powder (for example, carbon black), wood meal, ceramic fibers, carbon fibers, and the like. The amount (content) of consumption when the filling material is used may vary according to the kinds of filling materials to be used and the applications of injection molded products. Typically, it is preferable to knead the filling material in a ratio that is approximately 1 mass % to 60 mass % of the entire molding material. Otherwise, a molding material of the composition that does not substantially contain the filling material may be used. This molding material can be made to contain various supplementary ingredients (additives) other than the aforementioned solid filling material as an arbitrary component if necessary. The supplementary ingredients include an antioxidant, a light stabilizer, an UV absorber, a plasticizer, a lubricant, a colorant (a pigment, a dye), a flame retardant, a dispersant, an antibacterial agent, an antistatic agent, and the like.

Figure 1:
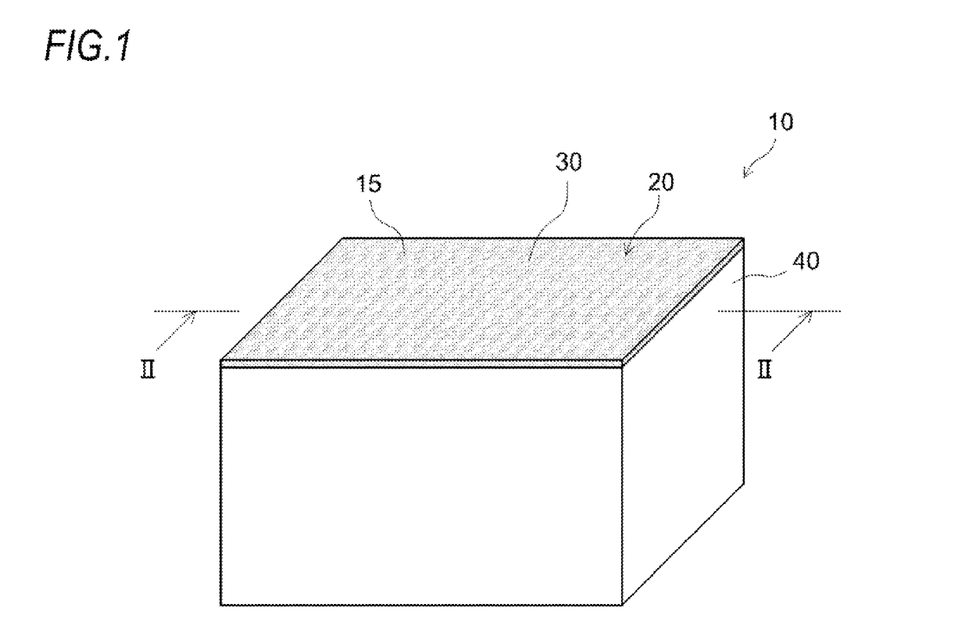
FIG. 1 is a perspective view schematically showing the appearance of an injection molded product according to an embodiment of the invention.
Figure 2:
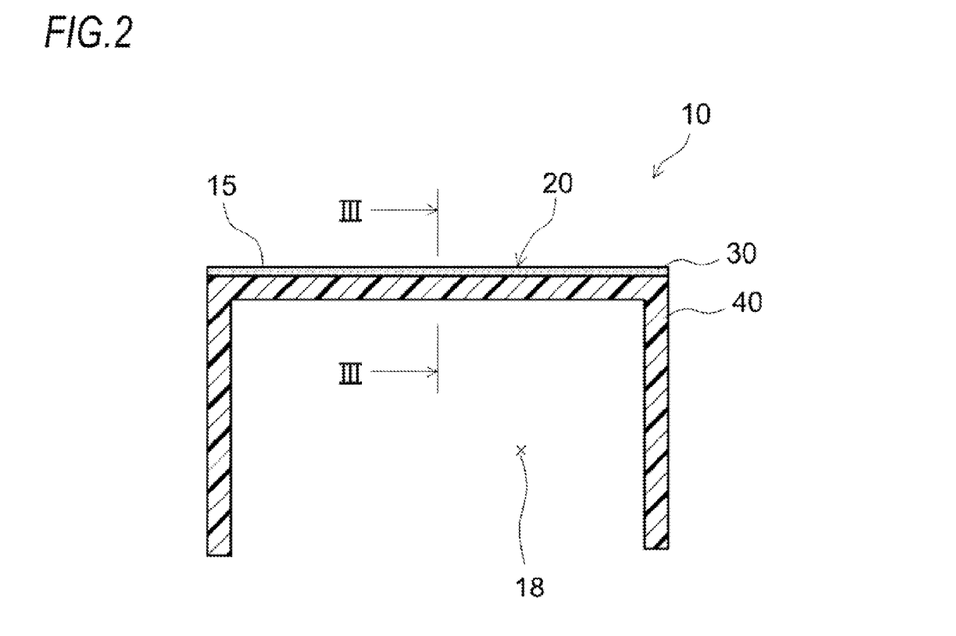
FIG. 2 is a cross-sectional view taken along line II-II in FIG. 1.
Figure 3:
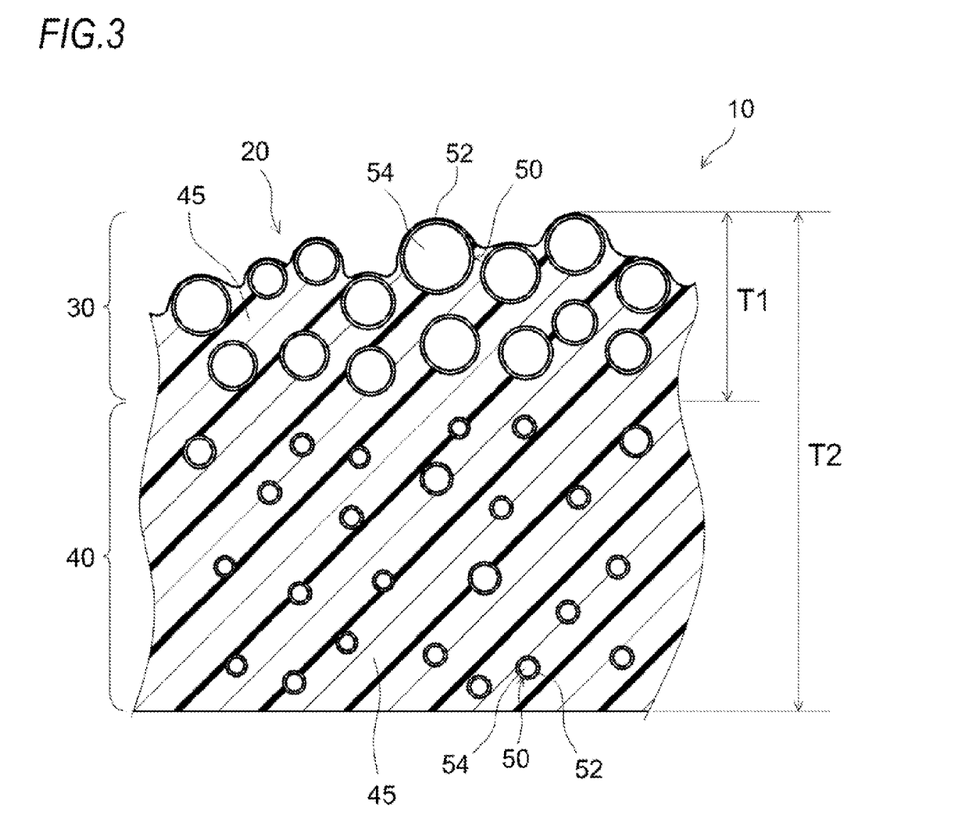
FIG. 3 is a cross-sectional view taken along line III-III in FIG. 2.

Hereinafter, a preferred embodiment (first embodiment) of an injection molded product of the invention will be described in detail, referring to the drawings. FIG. 1 is a perspective view schematically showing the appearance of an injection molded product 10 that is a vehicle interior equipment attachable to a predetermined portion inside an automobile (vehicle). FIG. 2 is a cross-sectional view taken along line II-II in FIG. 1, and is a cross-sectional view of the injection molded product 10. FIG. 3 is a cross-sectional view taken along line III-III in FIG. 2, and is a cross-sectional view showing a highly expanded portion 30 and a main body portion 40 of an unevenness forming portion 20, which are formed in a thickness direction of the injection molded product 10.

As shown in FIGS. 1 and 2, the injection molded product 10 according to the present embodiment is molded in the shape of a box with one bottom surface being open. The unevenness forming portion 20 having unevenness formed by the thermal expansion of thermally expandable capsules 50 (see FIG. 3) is formed to at least a portion of the surface of the injection molded product 10. The injection molded product 10 is mounted on a predetermined portion inside an automobile so as to block an opening 18 of the injection molded product 10 (hereinafter, supposed to be mounted on an automobile). The injection molded product 10 includes at least one design surface 15 exposed to the interior of the automobile when being mounted on the automobile. The injection molded product 10 according to the present embodiment includes one design surface 15. The unevenness forming portion 20 is formed over the entire design surface 15.

As shown in FIG. 3, the injection molded product 10 includes the highly expanded portion 30 that is formed at the surface side of the unevenness forming portion 20 in the thickness direction of the injection molded product 10 and in which the thermally expandable capsules 50 are thermally expanded, and the main body portion 40 that is a portion adjacent to the highly expanded portion 30 in the thickness direction and in which the thermally expandable capsules 50 are substantially not thermally expanded. In the thermally expandable capsules 50 included in the main body portion 40, the particle diameters of the thermally expandable capsules 50 are relatively small because the encapsulated substance 54 does not substantially expand in volume and the outer shells 52 are not substantially stretched. The average particle diameter of the thermally expandable capsules 50 included in the main body portion 40 is smaller than 50 µm (for example, about 15 µm or larger and smaller than 50 µm). On the other hand, in the thermally expandable capsules 50 included in the highly expanded portion 30, the encapsulated substance 54 expands in volume, and the outer shells 52 are stretched. For this reason, the particle diameters of the thermally expandable capsules 50 are larger than the particle diameters of the thermally expandable capsules 50 included in the main body portion 40. The average particle diameter of the thermally expandable capsules included in the highly expanded portion 30 is 50 µm or larger (for example, about 50 µm or larger and 150 µm or smaller). When the average particle diameter is much smaller than 50 µm, there is a concern that unevenness of the surface of the highly expanded portion 30 may be small and the appearance can not be easily seen in a fabric tone. According to this configuration, excellent unevenness is formed on the surface of the highly expanded portion 30, and a decrease in density is suppressed and the rigidity of the injection molded product 10 can be ensured in the main body portion 40. In addition, the thermally expandable capsules 50 that have exploded may be present in the highly expanded portion 30.

In the injection molded product 10 according to the present embodiment, a polymer material 45 that constitutes the highly expanded portion 30 and a polymer material 45 that constitutes the main body portion 40 are the same polymer material. The highly expanded portion 30 and the main body portion 40 are integrally molded. As shown in FIG. 3, a thickness T1 of the highly expanded portion 30 is a half or smaller (for example, a third or smaller) than a thickness T2 of the injection molded product 10 in the unevenness forming portion 20. By making a ratio of the highly expanded portion 30 in the unevenness forming portion 20 small and making the ratio of the main body portion 40 in the unevenness forming portion 20 large, a desired design surface is realized, and a decrease in the density of the injection molded product 10 in the unevenness forming portion 20 can be suppressed. This enables the rigidity of the injection molded product 10 to be kept high. Here, the thickness T1 of the highly expanded portion 30 is preferably 100 µm or larger (for example, 100 µm to 600 µm). When the thickness T1 of the highly expanded portion 30 is smaller than 100 µm, the number of thermally expandable capsules 50 that are included in the highly expanded portion 30 and have expanded thermally is too small. Thus, there is a concern that unevenness of the surface of the highly expanded portion 30 becomes small and the appearance can not be easily seen in a fabric tone.

In the surface of the highly expanded portion 30, a maximum cross-section height Rt of a roughness curve specified in JIS B0601:2001 is preferably 30 µm or larger and smaller than 200 µm. When Rt is smaller than 30 µm, there is a concern that unevenness is hardly formed on the surface (namely, the surface of the injection molded product 10) of the highly expanded portion 30 and may become almost smooth. On the other hand, when Rt is larger than 200 µm, there is a concern that the unevenness formed on the surface (namely, the surface of the injection molded product 10) of the highly expanded portion 30 may become too large and the appearance quality may be degraded. Additionally, an arithmetic mean roughness Ra of the roughness curve specified in JIS B0601:2001 in the surface of the highly expanded portion 30 is preferably 7 µm or larger and 25 µm or smaller (for example, 8 µm or larger and 22 µm or smaller). Additionally, a maximum height roughness Rz of the roughness curve specified in JIS B0601:2001 in the surface of the highly expanded portion 30 is preferably 40 µm or larger and 140 µm or smaller (for example, 43 µm or larger and 132 µm or smaller). Additionally, a maximum peak height Rp of the roughness curve specified in JIS B0601:2001 in the surface of the highly expanded portion 30 is preferably 25 µm or larger and 65 µm or smaller (for example, 27 µm or larger and 63 µm or smaller). Additionally, a ten-point average roughness Rzjis of the roughness curve specified in JIS B0601:2001 in the surface of the highly expanded portion 30 is preferably 30 µm or larger and 95 µm or smaller (for example, 32 µm or larger and 93 µm or smaller). Additionally, an average length RSm of roughness curve elements specified in JIS B0601:2001 in the surface of the highly expanded portion 30 is preferably 1050 µm or larger and 1500 µm or smaller (for example, 1082 µm or larger and 1482 µm or smaller). In addition, the aforementioned respective parameters in the surface of the highly expanded portion 30 can be measured by using, for example, a trade name "SURFCOM 1400D (registered trademark)" made by Tokyo Seimitsu Co., Ltd. Here, values, such as the aforementioned Rt, are realized by executing a heating step as will be described later with respect to the main body portion 40 of the injection molded body 60.

Figure 4:
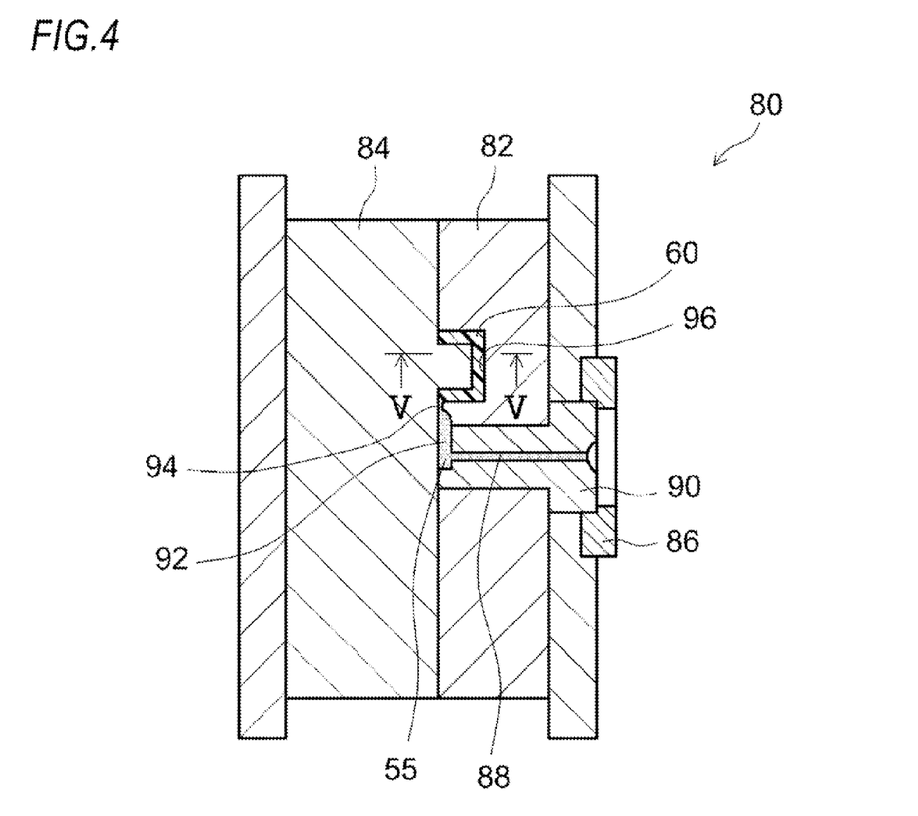
FIG. 4 is a cross-sectional view showing an injection mold used for molding an injection molded body according to the embodiment of the invention.
Figure 5:
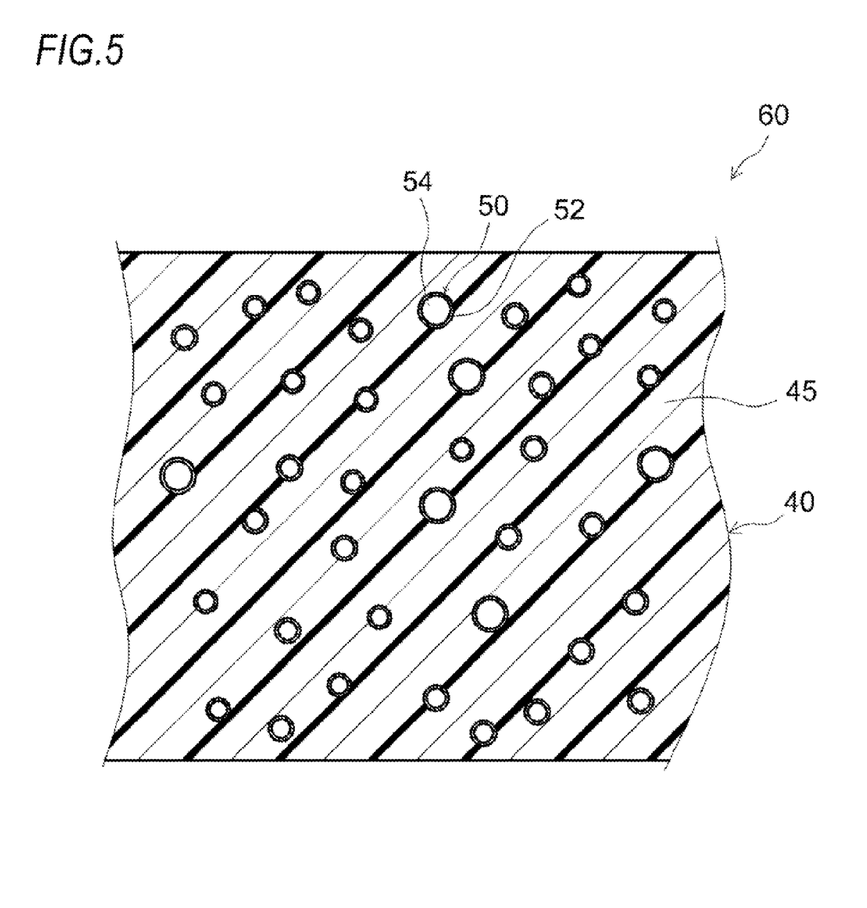
FIG. 5 is a cross-sectional view taken along line V-V in FIG. 4.
Figure 6:
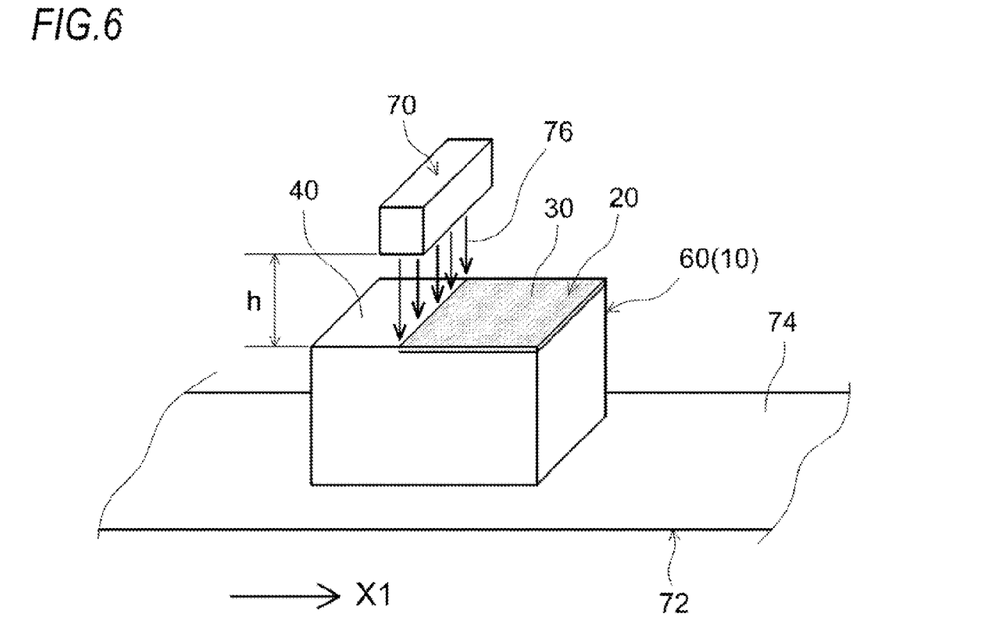
FIG. 6 is a perspective view showing a heating step of a method for manufacturing the injection molded product according to the embodiment of the invention.

Next, a preferred embodiment of a method for manufacturing the injection molded product of the invention will be described in detail, referring to FIGS. 4 to 6. FIG. 4 is a cross-sectional view showing an injection mold 80 used for molding an injection molded body 60 according to the first embodiment of the invention. FIG. 5 is a cross-sectional view taken along line V-V in FIG. 4, and is a cross-sectional view of the injection molded body 60. FIG. 6 is a perspective view showing a heating step of the method for manufacturing the injection molded product 10 according to the first embodiment.

As shown in FIG. 4, the injection mold 80 according to the present embodiment includes a pair of openable/closable molds 82 and 84. The pair of molds 82 and 84 consist of a fixed type fixed mold 82 and a movable type movable mold 84, and have a predetermined molding cavity formed therein by mold closing. The fixed mold 82 of the injection mold 80 has a locating ring 86 for inserting an injection nozzle (not shown) of an injection molding apparatus, and a sprue bushing 90 that has a sprue 88 formed therein. The inner surfaces (split surfaces) of the fixed mold 82 and the movable mold 84 of the injection mold 80 are generally formed with a sprue 92, an injection gate 94, and a molding cavity 96 when the molds are closed.

In order to produce the injection molded product 10 according to the present embodiment, first, a molding material 55 in which the aforementioned polymer material 45 and the aforementioned thermally expandable capsules 50 are mixed is prepared. A filling step of injecting and filling the prepared molding material 55 into the injection mold 80 that is formed with the molding cavity 96 having a predetermined shape is executed. That is, the molding cavity 96 is filled with the molding material 55 by injecting the heated and melted liquid molding material 55 into the molding cavity 96 from the injection gate 94 via the sprues 88 and 92. Although not particularly limited, when the total amount of the molding material 55 is 100 mass %, the mass ratio of the thermally expandable capsules 50 included in the molding material 55 can be, for example, about 0.1 mass % to 10 mass %.

Here, the thermally expandable capsules 50 included in the molding material 55 has a softening temperature (expansion start temperature: generally, 160° C. to 180° C.) lower than the injection molding temperature (generally, 150° C. to 250° C.) of the molding material 55.

Next, a step of cooling and solidifying the filled molding material 55 so as to mold the injection molded body 60 is executed. That is, the injection molded body 60 is molded within the molding cavity 96 by cooling and solidifying the molding material 55 filled into the molding cavity 96 (typically, cooling and solidifying the polymer material 45). In addition, internal pressure is applied to the molding material 55 filled into the molding cavity 96. For this reason, if the movable mold 84 is opened before the cooling and solidifying and the pressure applied to the molding material 55 is released, the thermally expandable capsules 50 in the molding material 55 thermally expand. In the present embodiment, however, since the molding material 55 is cooled and solidified in a state where the internal pressure is applied to the molding material 55, the thermal expansion of the thermally expandable capsules 50 is substantially prevented.

Next, a taking-out step of taking out the cooled and solidified injection molded body 60 from the injection mold 80 is executed. That is, the injection molded body 60 that is formed within the molding cavity 96 is taken out by opening the movable mold 84. The taken-out injection molded body 60, as shown in FIG. 5, includes only the main body portion 40 in which the thermally expandable capsules 50 are substantially not thermally expanded.

Next, the heating step of heating at least a portion of the surface of the taken-out injection molded body 60, and thermally expanding the thermally expandable capsules 50 included in a predetermined portion from the surface of the injection molded body 60 to a half or smaller than the thickness of the injection molded body 60 is executed. That is, as shown in FIG. 6, the injection molded body 60 is placed on a belt 74 of a belt conveyor 72 including a heating apparatus 70, and the surface of the injection molded body 60 is heated. It is preferable to perform the heating of the surface of the injection molded body 60 by using radiant heat. A preferable example of the heating apparatus 70 includes a near-infrared ray irradiation apparatus 70 that can emit the radiant heat caused by near infrared rays 76 to the surface of the injection molded body 60. The injection molded body 60 is moved in the direction of arrow X1 of FIG. 6 by the belt conveyor 72, and the surface of the injection molded body 60 is irradiated and heated from the near-infrared ray irradiation apparatus 70 with the near infrared rays 76. At this time, the surface of the injection molded body 60 is heated to a temperature or higher at which the thermally expandable capsules 50 included in the main body portion 40 thermally expand, and the surface temperature of the injection molded body 60 is made high. Accordingly, the thermally expandable capsules 50 thermally expand, the polymer material 45 is thermally deformed, and in at least a portion of the surface of the injection molded body 60, the unevenness forming portion 20 having the unevenness formed by the thermal expansion of the thermally expandable capsules 50 can be formed. The injection molded product 10, in which the unevenness forming portion 20 having the unevenness formed by the thermal expansion of the thermally expandable capsules 50 is formed to at least a portion of the surface of the injection molded product 10, can be manufactured as described above.

The surface temperature of the injection molded body 60 during the surface heating of the injection molded body 60 is preferably a temperature such that the thermally expandable capsules 50 thermally expand. For example, the surface temperature of the injection molded body 60 can be about 80° C. to about 230° C. If the surface temperature of the injection molded body 60 becomes high, the thermal expansion of the thermally expandable capsules 50 becomes large. As a result, parameters, such as the aforementioned Rt, in the surface of the highly expanded portion 30 become large. In addition, when the surface temperature is much higher than 230° C., thermal decomposition of the polymer material 45 occurs, and parameters, such as the aforementioned Rt, become small. As a result, there is a concern that the appearance can not be easily seen in a fabric tone.

By appropriately adjusting the surface temperature or the heating time of the injection molded body 60, it is possible to determine a thickness (depth) from the surface of the injection molded body 60, in which the thermally expandable capsules 50 included therein should be thermally expanded. In the highly expanded portion 30 in which the thermally expandable capsules 50 are thermally expanded, the density will decrease greatly because the occupied volumes of spaces surrounded by the outer shells 52 become large. Accordingly, when securement of the rigidity of the injection molded product 10 is taken into consideration, the injection molded body 60 is preferably heated at a temperature or with a time such that the thermally expandable capsules 50 included in a portion with a thickness of a half or smaller of the thickness of the injection molded body 60 from the surface of the injection molded body 60, that is, a portion located further toward the surface side than the center of the injection molded body 60 in the thickness direction of the injection molded body 60, are thermally expanded.

In addition, the heating apparatus 70 that heats the surface of the injection molded body 60 is not limited to the near-infrared ray irradiation apparatus. For example, the heating apparatus includes a burner that blows flames against the surface of the injection molded body 60, a hot-blast heater that blows a hot blast against the surface, a high-frequency heater using high frequency, a laser irradiation apparatus, a middle infrared ray irradiation apparatus, or the like. Additionally, in the present embodiment, the surface of the injection molded body 60 is irradiated with the near infrared rays 76 by fixing the near-infrared ray irradiation apparatus 70 and moving the injection molded body 60. However, the injection molded body 60 may be fixed and the near-infrared ray irradiation apparatus 70 may be moved, or both the injection molded body 60 and the near-infrared ray irradiation apparatus 70 may be moved with respect to each other.

Additionally, as shown in FIG. 6, the heating apparatus 70 according to the present embodiment irradiates the near infrared rays 76 linearly with a width equal to the width of the injection molded body 60. However, the near infrared rays 76 may be irradiated with a width broader than or a width narrower than that of the width of the injection molded body 60, or the near infrared rays 76 may be irradiated in dots. When the irradiation range is narrower than the width of the injection molded body 60, a predetermined pattern can be drawn on the surface of the injection molded body 60 by heating the surface of the injection molded body 60 while moving at least any one of the heating apparatus 70 and the injection molded body 60 in two or more directions. For example, when the near infrared rays 76 are irradiated in dots, a design resembling an embossed pattern can be expressed on the surface of the injection molded body 60.

In the injection molded product 10 according to the present embodiment, the thermally expandable capsules 50 included in the highly expanded portion 30 are thermally expanded. Therefore, the unevenness forming portion 20 based on the thermally expandable capsules 50 is formed on the surface (the surface of the highly expanded portion 30) of the injection molded product 10. Accordingly, the fabric-like appearance including fine unevenness is formed on the surface of the injection molded product 10. Moreover, the highly expanded portion 30 and the main body portion 40 are molded from the same polymer material 45, and the highly expanded portion 30 and the main body portion 40 are integrally molded. For this reason, the main body portion 40 and the highly expanded portion 30 are not peeled off, and the appearance of the injection molded product 10 can be prevented from being poor. Furthermore, the thickness of the highly expanded portion 30 in which the thermally expandable capsules 50 are thermally expanded is a half or smaller than the thickness of the injection molded product 10 in the unevenness forming portion 20, and the thermally expandable capsules 50 are substantially not thermally expanded in the main body portion 40 as the other portion. For this reason, securement of the appearance quality of the injection molded product 10 and securement of the rigidity of the injection molded product 10 can be realized.

Figure 7:
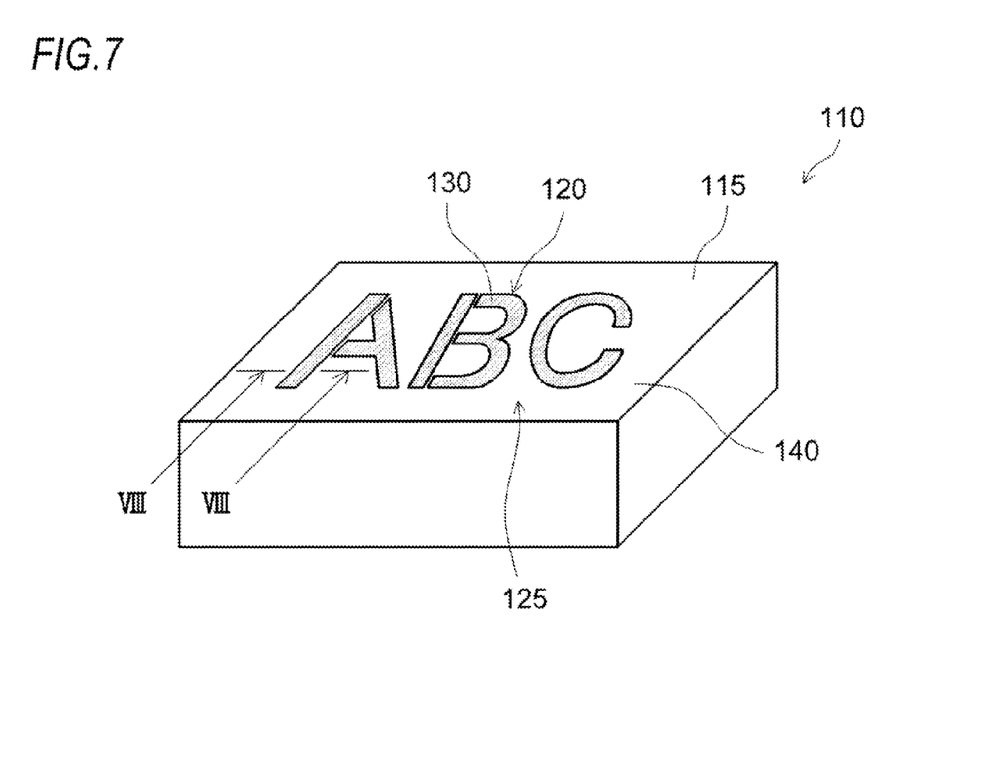
FIG. 7 is a perspective view schematically showing the appearance of an injection molded product according to another embodiment of the invention.
Figure 8:
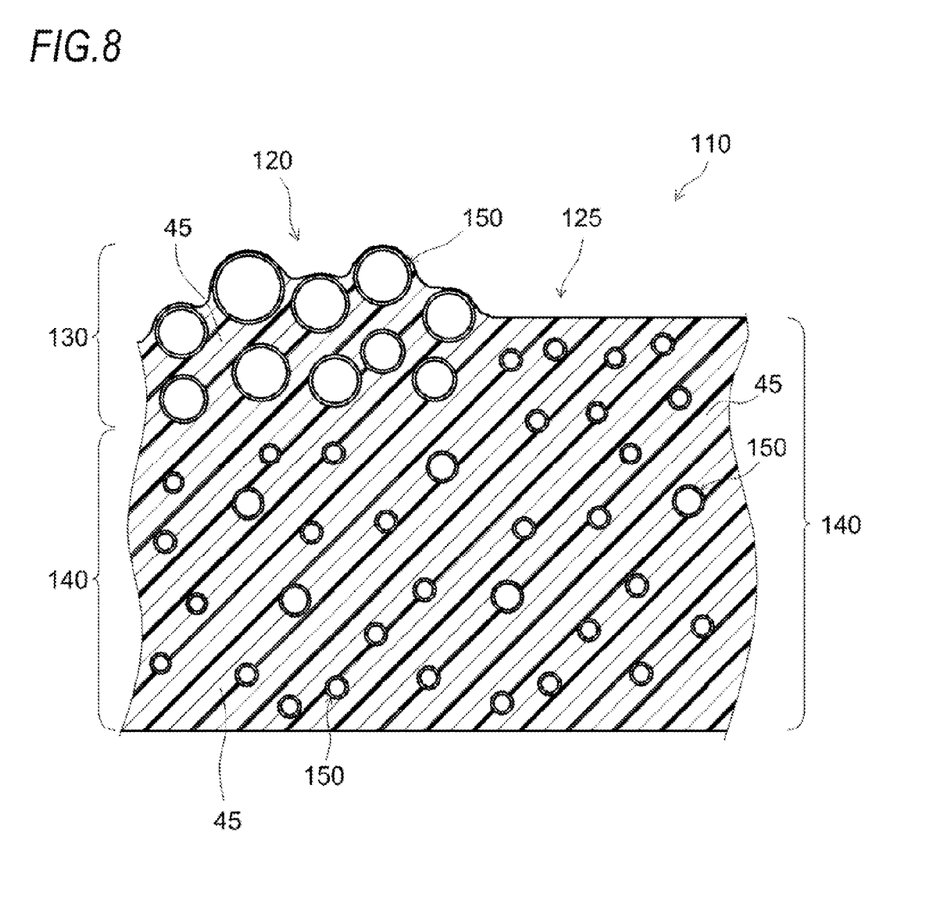
FIG. 8 is a cross-sectional view taken along line VIII-VIII in FIG. 7.

In the aforementioned first embodiment, the unevenness forming portion 20 is formed over the entire design surface 15 of the injection molded product 10. However, the invention is not limited thereto. Hereinafter, a case where an unevenness forming portion is partially formed to a design surface of an injection molded product will be described as a second embodiment. FIG. 7 is a perspective view schematically showing the appearance of an injection molded product 110 that is a vehicle interior equipment attachable to a predetermined portion inside an automobile (vehicle). FIG. 8 is a cross-sectional view taken along line VIII-VIII in FIG. 7.

As shown in FIG. 7, the injection molded product 110 according to the present embodiment includes a design surface 115. An unevenness forming portion 120 is partially formed on a surface, that is, a design surface 115 of the injection molded product 110. As shown in FIG. 8, the injection molded product 110 has a highly expanded portion 130 that is formed at the surface side of the unevenness forming portion 120 in the thickness direction of the injection molded product 110 and in which thermally expandable capsules 150 are thermally expanded, and a main body portion 140 that is a portion adjacent to the highly expanded portion 130 in the thickness direction and in which the thermally expandable capsules 150 are substantially not thermally expanded. Moreover, the injection molded product 110 has the main body portion 140 over the entire injection molded product 110 in the thickness direction, in a smooth portion 125 that is the design surface 115 and is a portion to which the unevenness forming portion 120 is not formed. The injection molded product 110 according to the present embodiment becomes the injection molded product 110 that is excellent in design properties because the appearance quality of the unevenness forming portion 120 is excellent and desired characters are formed on the surface (design surface 115) of the injection molded product 110 by using the unevenness forming portion 120.

Figure 9:
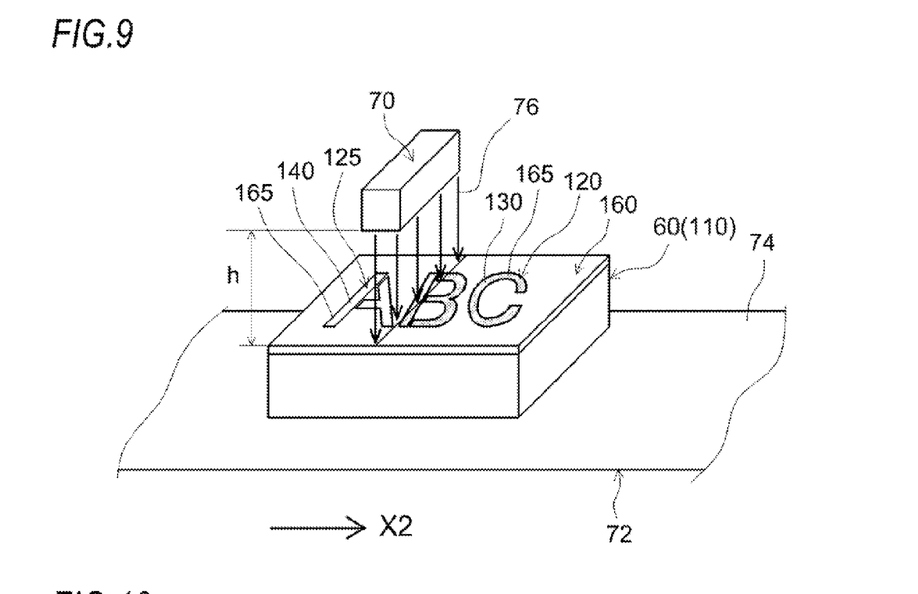
FIG. 9 is a perspective view showing a heating step of a method for manufacturing an injection molded product according to another embodiment of the invention.

Next, a preferable example of a method for manufacturing the injection molded product 110 according to the second embodiment will be described by referring to FIG. 9. FIG. 9 is a perspective view showing a heating step of the method for manufacturing the injection molded product 110 according to the second embodiment. In addition, since steps until a taking-out step of taking out the cooled and solidified injection molded body 60 from the injection mold 80 are the same as those of the first embodiment, the description thereof is omitted.

In the heating step of the manufacturing method according to the present embodiment, as shown in FIG. 9, the injection molded body 60 is placed on the belt 74 of the belt conveyor 72 including the heating apparatus 70, and the surface of the injection molded body 60 is heated. Before the surface of the injection molded body 60 is heated, the surface of the injection molded body 60 is partially covered with a heat shield 160. The heat shield 160 can be the heat shield 160 in which desired characters, desired figures, or the like are formed by partially cutting out the heat shield 160. The heat shield 160 is not particularly limited if heat is shielded and heat is not transferred to the injection molded body 60 via the heat shield 160. For example, a heat shield molded from a material having a melting point of 250° C. or higher is preferable. When the near-infrared ray irradiation apparatus 70 is used as a heating apparatus, the heat shield includes, for example, stainless steel that do not allow the near infrared rays 76 to be transmitted therethrough and has a melting point of 250° C. or higher. In addition, the materials of the heat shield 160 to be used can be appropriately selected corresponding to heating methods. For example, materials that reflect near infrared rays are preferable when the near infrared rays are used, and materials with high incombustibility are preferable when flames are used.

The injection molded body 60 that is partially covered with the heat shield 160 is moved in the direction of arrow X2 of FIG. 9 by the belt conveyor 72, and an exposed portion 165 of the injection molded body 60 that is exposed without being covered with the heat shield 160 is irradiated and heated from the near-infrared ray irradiation apparatus 70 with the near infrared rays 76. Accordingly, the unevenness forming portion 120 having the unevenness formed by the thermal expansion of the thermally expandable capsules 150 (see FIG. 8) can be formed to the exposed portion 165 of the injection molded body 60. The injection molded product 110, in which the unevenness forming portion 120 having the unevenness formed by the thermal expansion of the thermally expandable capsules 50 is partially formed, can be manufactured as described above. In addition, since the portion of the surface of the injection molded product 110 covered with the heat shield 160 is not heated in the heating step, the portion is substantially not formed with unevenness and is in a substantially smooth state.

Figure 10:
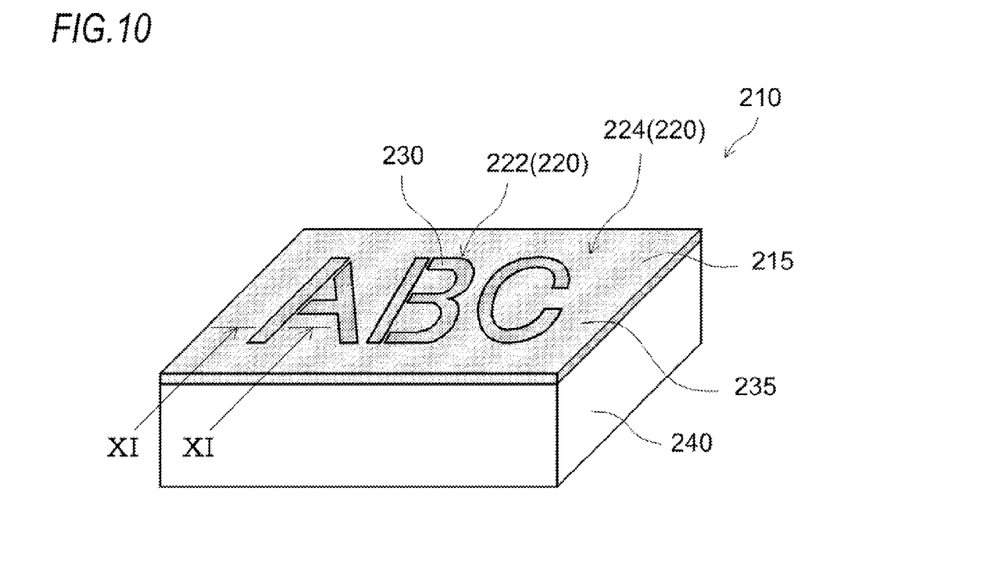
FIG. 10 is a perspective view schematically showing the appearance of an injection molded body according to another embodiment of the invention.
Figure 11:
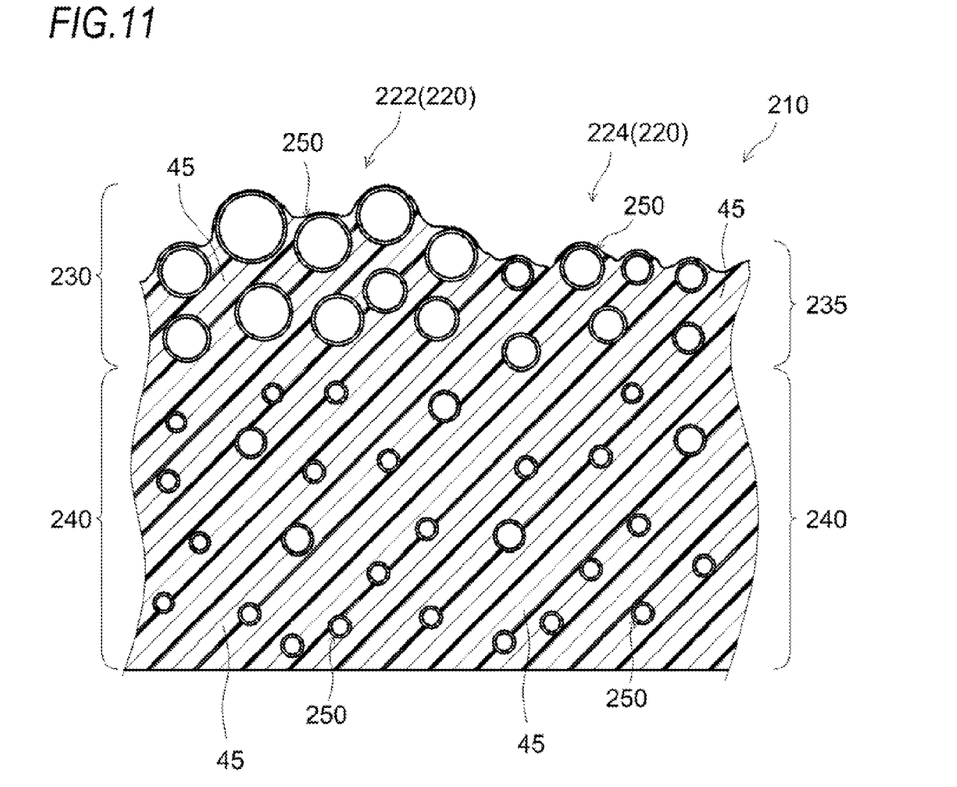
FIG. 11 is a cross-sectional view taken along line XI-XI in FIG. 10.

Next, a case where an unevenness forming portion having unevenness in which the degree of unevenness varies depending on positions is formed in a design surface of an injection molded product will be described as a third embodiment. FIG. 10 is a perspective view schematically showing the appearance of an injection molded product 210 that is a vehicle interior equipment that is attachable to a predetermined portion inside an automobile (vehicle). FIG. 11 is a cross-sectional view taken along line XI-XI in FIG. 10.

As shown in FIG. 10, the injection molded product 210 according to the present embodiment includes one design surface 215. An unevenness forming portion 220 is formed over a surface, that is, the entire design surface 215 of the injection molded product 210. The unevenness forming portion 220 has a first unevenness portion 222 having a higher degree of unevenness, and a second unevenness portion 224 with a lower degree of unevenness as compared to the first unevenness portion 222.

As shown in FIG. 11, the injection molded product 210 includes a highly expanded portion 230 that is formed at the surface side of the first unevenness portion 222 of the unevenness forming portion 220 in the thickness direction of the injection molded product 210 and in which thermally expandable capsules 250 are thermally expanded, and a main body portion 240 that is a portion adjacent to the highly expanded portion 230 in the thickness direction and in which the thermally expandable capsules 250 are substantially not thermally expanded. Moreover, the injection molded product 210 includes a expansion portion 235 that is formed on the surface side of the second unevenness portion 224 of the unevenness forming portion 220 in the thickness direction of the injection molded product 210 and in which the thermally expandable capsules 250 are thermally expanded, and the main body portion 240 that is a portion adjacent to the expansion portion 235 in the thickness direction and in which the thermally expandable capsules 250 are substantially not thermally expanded. In the highly expanded portion 230, the thermal expansion of the thermally expandable capsules 250 is larger compared to that of the expansion portion 235. Therefore the unevenness formed on the surface of the highly expanded portion 230 are made larger compared to the unevenness formed on the surface of the expansion portion 235. The injection molded product 210 according to the present embodiment becomes the injection molded product 210 that is excellent in design properties because the appearance quality of the unevenness forming portion 220 is excellent, and desired characters are formed on the surface (design surface 215) of the injection molded product 210, using the shade (or the degree of brightness) of a color resulting from a difference between the degrees of unevenness of the first unevenness portion 222 and the second unevenness portion 224.

The injection molded product 210 according to the third embodiment can be manufactured as follows. For example, the surface of the injection molded body 60 are irradiated and heated with the near infrared rays 76 from the near-infrared ray irradiation apparatus 70 (see FIG. 6). At this time, the degree of the thermal expansion of the thermally expandable capsules 250 is adjusted by adjusting heating time, surface temperature, or the like by the near infrared rays 76. This forms the second unevenness portion 224 on the surface of the injection molded body 60. Next, the surface of the injection molded body 60 after the heating (namely, the portion in which the second unevenness portion 224 is formed) is partially covered with the heat shield 160 (see FIG. 9), and the portion that is exposed without being covered with the heat shield 160 (namely, the first unevenness portion 222) is further heated. Accordingly, the thermally expandable capsules 250 included in the portion that is exposed without being covered with the heat shield 160 further thermally expand, and the first unevenness portion 222 with larger unevenness than the second unevenness portion 224 is formed. The injection molded product 210 in which the unevenness forming portion 220 having the first unevenness portion 222 and the second unevenness portion 224 having different degrees of unevenness mutually is formed can be manufactured as described above.

Alternatively, as another method, first, the surface of the injection molded body 60 is partially covered with the heat shield 160 (see FIG. 9). The exposed portion 165 (see FIG. 9) of the injection molded body 60 that is exposed without being covered with the heat shield 160 is irradiated and heated with the near infrared rays 76 from the near-infrared ray irradiation apparatus 70. Accordingly, the unevenness forming portion 220 having the unevenness formed by the thermal expansion of the thermally expandable capsules 250 can be formed to the exposed portion 165 of the injection molded body 60. Next, after the heat shield 160 is removed, the surface of the injection molded body 60 to which the unevenness forming portion 220 is formed is further heated. Accordingly, the thermally expandable capsules 250 included in the unevenness forming portion 220 further thermally expand, and the first unevenness portion 222 is formed. Meanwhile, the thermally expandable capsules 250 included in the portion that is covered in advance with the heat shield 160 in the first heating also thermally expand, and the second unevenness portion 224 is formed. Accordingly, the degrees of unevenness of the second unevenness portion 224 (unevenness forming portion 220) formed in the portion that is covered in advance with the heat shield 160 and the first unevenness portion 222 (unevenness forming portion 220) that is formed in the portion that has not been covered with the heat shield 160 in the first heating are different. The injection molded product 210 in which the unevenness forming portion 220 having the first unevenness portion 222 and the second unevenness portion 224 with different degrees of unevenness mutually is formed can be manufactured as described above.

Although examples regarding the invention will be described below, it is not meant to limit the invention to that shown in such specific examples.

A molding material is prepared in which 95 mass % of a trade name "ACTYMER (registered trademark)", which is made by Riken Technos Corporation and is styrene thermoplastic elastomer, as the polymer material, and 5 mass % of the trade name "ADVANCELL (registered trademark)", which is made by Sekisui Chemical Co., Ltd., as the thermally expandable capsules, are mixed. An injection molded body is molded by filling the aforementioned prepared molding material into the injection mold, and cooling and solidifying the molding material. In the surface of the molded injection molded body, the maximum cross-section height Rt of the roughness curve specified in JIS B0601: 2001 is 4.5 μm.

Next, a trade name "HYL25-14" made by HYBEC CORP. is used as the near-infrared apparatus, the aforementioned molded injection molded body is placed on the belt conveyor, and the surface of the injection molded body is heated. The focal distance (see symbol h of FIG. 6) of the near-infrared apparatus is 25 mm. An injection molded product according to Example 1 having an unevenness forming portion having unevenness on the surface thereof is manufactured by heating the injection molded body to thermally expand the thermally expandable capsules under the conditions that the speed of the belt conveyor is 36 cm/min and the surface temperature of the injection molded body is 143° C. The aforementioned maximum cross-section height Rt of the injection molded product according to Example 1 at this time is 93.3 μm. Additionally, the thickness T1 of the highly expanded portion is 500 μm, and is about a quarter of the thickness T2 of the injection molded product in the unevenness forming portion.

Additionally, an injection molded product according to Example 2 is manufactured. An injection molded product according to Example 2 is manufactured similarly to Example 1 except that the speed of the belt conveyor is 72 cm/min. The aforementioned maximum cross-section height Rt of the injection molded product according to Example 2 at this time is 69.9 μm. Additionally, the thickness T1 of the highly expanded portion is 300 μm, and is about one seventh of the thickness T2 of the injection molded product in the unevenness forming portion.

Although the specific examples of the invention have been described above in detail by referring to the drawings, these are just illustrative and do not limit the claims. Various modifications and alternations of the specific examples illustrated above are included within techniques set forth in the claims.

For example, although the unevenness forming portion having the first unevenness portion and the second unevenness portion with different degrees of unevenness mutually is formed in the aforementioned third embodiment, an unevenness forming portion having three or more unevenness portions with different degrees of unevenness mutually may be formed.

Additionally, in the aforementioned first embodiment to third embodiment, the injection molded product, which is a vehicle interior equipment that is attachable to a predetermined portion inside a vehicle, has been described. However, the application of the injection molded product according to the invention is not limited thereto. The injection molded product according to the invention can be preferably used as goods whose surfaces require fabric-like or lusterless appearances. For example, the injection molded product can be used for decorative parts of motorcycles or the like, or interior equipments and furniture of architectures, such as houses or buildings. Additionally, the injection molded product can also be used as decorations of home electronics, daily necessaries such as stationery and toys, or nursing care goods such as wheelchairs.

REFERENCE SIGNS LIST

10: INJECTION MOLDED PRODUCT
15: DESIGN SURFACE
18: OPENING
20: UNEVENNESS FORMING PORTION
30: HIGHLY EXPANDED PORTION
40: MAIN BODY PORTION
45: POLYMER MATERIAL
50: THERMALLY EXPANDABLE CAPSULE
52: OUTER SHELL
54: ENCAPSULATED SUBSTANCE
55: MOLDING MATERIAL
60: INJECTION MOLDED BODY
70: NEAR-INFRARED RAY IRRADIATION APPARATUS (HEATING APPARATUS)
72: BELT CONVEYOR
74: BELT
76: NEAR INFRARED RAY
80: INJECTION MOLD
82: FIXED MOLD
84: MOVABLE MOLD
86: LOCATING RING
88: SPRUE
90: SPRUE BUSHING
92: SPRUE
94: INJECTION GATE
96: MOLDING CAVITY
110: INJECTION MOLDED PRODUCT
115: DESIGN SURFACE
120: UNEVENNESS FORMING PORTION
125: SMOOTH PORTION
130: HIGHLY EXPANDED PORTION
140: MAIN BODY PORTION
150: THERMALLY EXPANDABLE CAPSULE
160: HEAT SHIELD
165: EXPOSED PORTION
210: INJECTION MOLDED PRODUCT
215: DESIGN SURFACE
220: UNEVENNESS FORMING PORTION
222: FIRST UNEVENNESS PORTION
224: SECOND UNEVENNESS PORTION
230: HIGHLY EXPANDED PORTION
235: EXPANSION PORTION
240: MAIN BODY PORTION
250: THERMALLY EXPANDABLE CAPSULE

The invention claimed is:

1. An injection molded product that is injection molded from a molding material including a polymer material and a plurality of thermally expandable capsules mixed therein,
wherein an unevenness forming portion, which has unevenness formed by the thermally expandable capsules after thermal expansion, is formed to only a portion of a design surface formed to a surface of the injection molded product and is visually recognizable when the injection molded product is mounted on a predetermined portion,
wherein the injection molded product includes:
a highly expanded portion that is formed at a surface side of the unevenness forming portion in a thickness direction of the injection molded product and in which the thermally expandable capsules are thermally expanded; and
a main body portion that is a portion adjacent to the highly expanded portion in the thickness direction and in which the thermally expandable capsules are substantially not thermally expanded,
wherein a thickness of the highly expanded portion is a half or smaller than a thickness of the injection molded product in the unevenness forming portion, and
wherein a polymer material of the highly expanded portion and a polymer material of the main body portion are the same polymer material.

2. The injection molded product according to claim 1, wherein the unevenness forming portion includes:
a first unevenness portion comprising the highly expanded portion formed at a surface side of the first unevenness portion in the thickness direction of the injection molded product and in which the thermally expandable capsules are thermally expanded; and
a second unevenness portion comprising an expansion portion formed at a surface side of the second unevenness portion in the thickness direction of the injection molded product and in which the thermally expandable capsules are thermally expanded, the thermal expansion of the thermally expandable capsules in the expansion portion being less than the thermal expansion of the thermally expandable capsules in the highly expanded portion.

3. The injection molded product according to claim 1, wherein an average particle diameter of the thermally expandable capsules included in the main body portion is smaller than 50 μm, and an average particle diameter of the thermally expandable capsules included in the highly expanded portion is 50 82 m or larger.

4. The injection molded product according to claim 1, wherein, in the surface of the highly expanded portion, a maximum cross-section height Rt of a roughness curve specified in JIS B0601:2001 is 30 μm or larger and smaller than 200 μm.

5. The injection molded product according to claim 1, wherein the injection molded product is a vehicle interior equipment that is attachable to the predetermined portion inside a vehicle, and the design surface is exposed to an interior of the vehicle when being mounted on the predetermined portion.

6. A method of manufacturing the injection molded product of claim 1, the method comprising:
a filling step of injecting and filling a molding material having the polymer material and the thermally expandable capsules mixed therein into an injection mold formed with a molding cavity having a predetermined shape;
a molding step of cooling and solidifying the filled molding material to mold an injection molded body;
a taking-out step of taking out the cooled and solidified injection molded body from the injection mold; and
a heating step of partially covering the surface of the taken-out injection molded body with a heat shield and heating a portion exposed without being covered with the heat shield, thereby thermally expanding the thermally expandable capsules included in a predetermined portion from the surface of the injection molded body to a thickness of a half or smaller of the thickness of the injection molded body.

7. The manufacturing method according to claim 6, wherein, in the heating step, after removing the heat shield, by further heating the surface of the injection molded body, degrees of the unevenness of the unevenness forming portion formed to a portion covered in advance with the heat shield and the unevenness forming portion formed to a portion that is not covered with the heat shield are made different from each other.

8. The manufacturing method according to claim 6, wherein, in the heating step, after the surface of the injection molded body is heated, by partially covering the surface of the injection molded body with a heat shield and further heating the portion that is exposed without being covered with the heat shield, degrees of the unevenness of the unevenness forming portion formed to a portion covered with a heat shield and the unevenness forming portion formed to a portion that is not covered with the heat shield are made different from each other.

9. The manufacturing method according to claim 6, wherein, in the heating step, the heating of the injection molded body is performed by using radiant heat.

10. The manufacturing method according to claim 9, wherein the radiant heat is generated by using a near-infrared ray irradiation apparatus.

11. An injection molded product that is injection molded from a molding material including a polymer material and a plurality of thermally expandable capsules mixed therein,
wherein an unevenness forming portion, which has unevenness formed by the thermally expandable capsules after thermal expansion, is formed to only a portion of a surface of the injection molded product and includes:
a first unevenness portion comprising a highly expanded portion formed at a surface side of the first unevenness portion in a thickness direction of the injection molded product and in which the thermally expandable capsules are thermally expanded; and
a second unevenness portion comprising an expansion portion formed at a surface side of the second unevenness portion in the thickness direction of the injection molded product and in which the thermally expandable capsules are thermally expanded, the thermal expansion of the thermally expandable capsules in the expansion portion being less than the thermal expansion of the thermally expandable capsules in the highly expanded portion,
wherein the injection molded product includes:
a highly expanded portion that is formed at a surface side of the unevenness forming portion in the thickness direction of the injection molded product and in which the thermally expandable capsules are thermally expanded; and
a main body portion that is a portion adjacent to the highly expanded portion in the thickness direction and in which the thermally expandable capsules are substantially not thermally expanded,
wherein a thickness of the highly expanded portion is a half or smaller than a thickness of the injection molded product in the unevenness forming portion, and
wherein a polymer material of the highly expanded portion and a polymer material of the main body portion are the same polymer material.

* * * * *